INVENTORS
A.J. CIHLAR
F.A. KLASEK
BY C. B. Hamilton
ATTORNEY

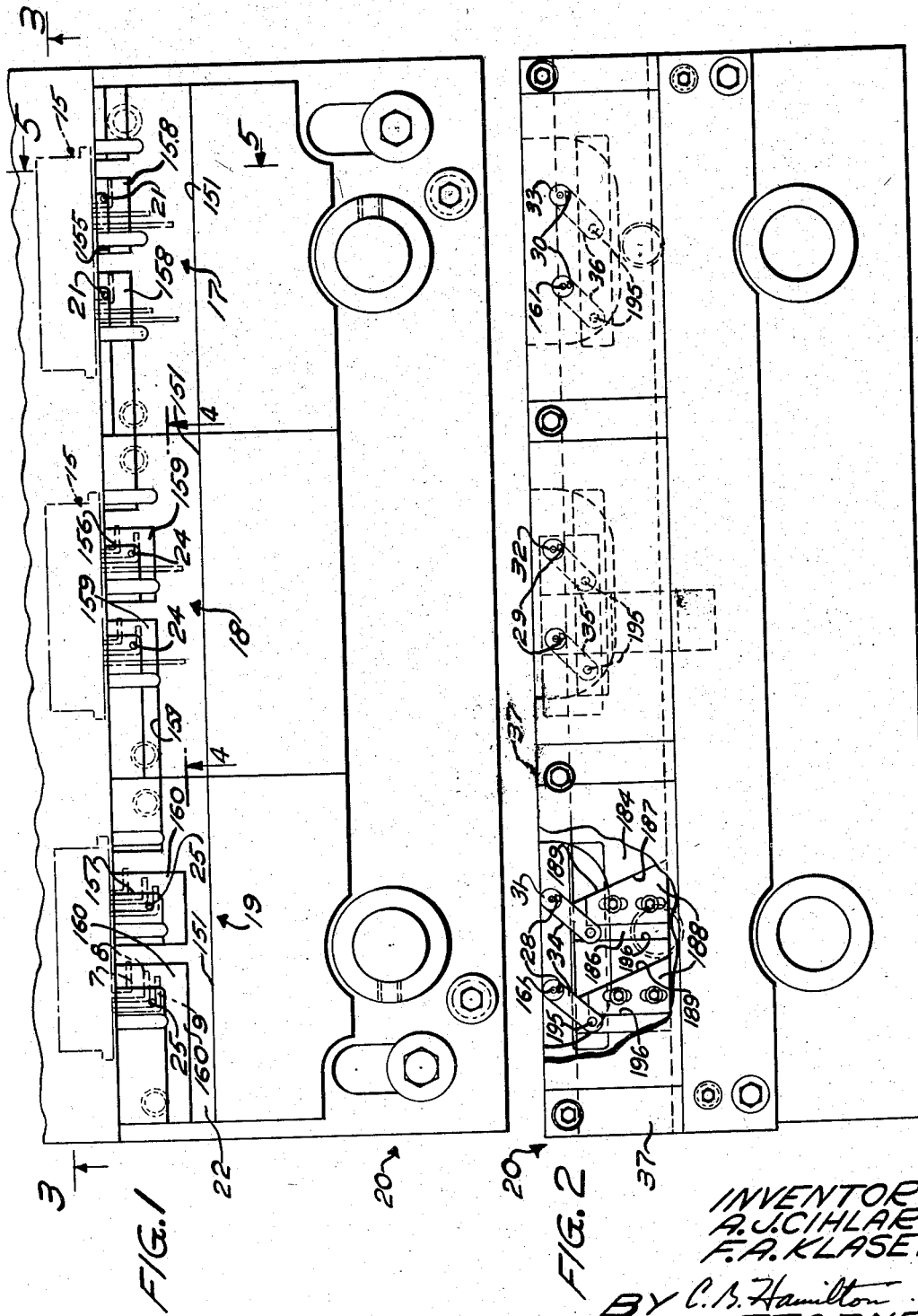

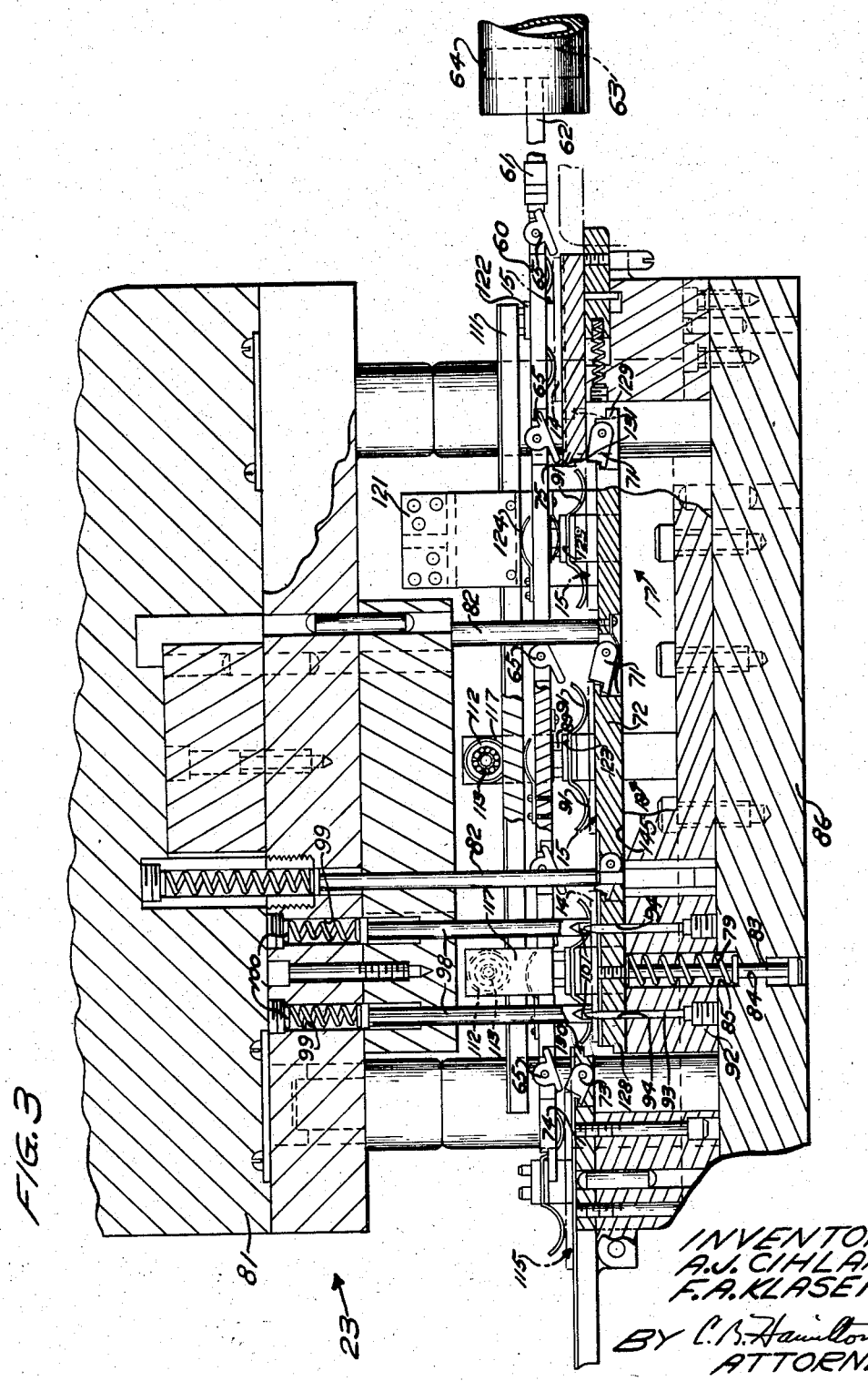

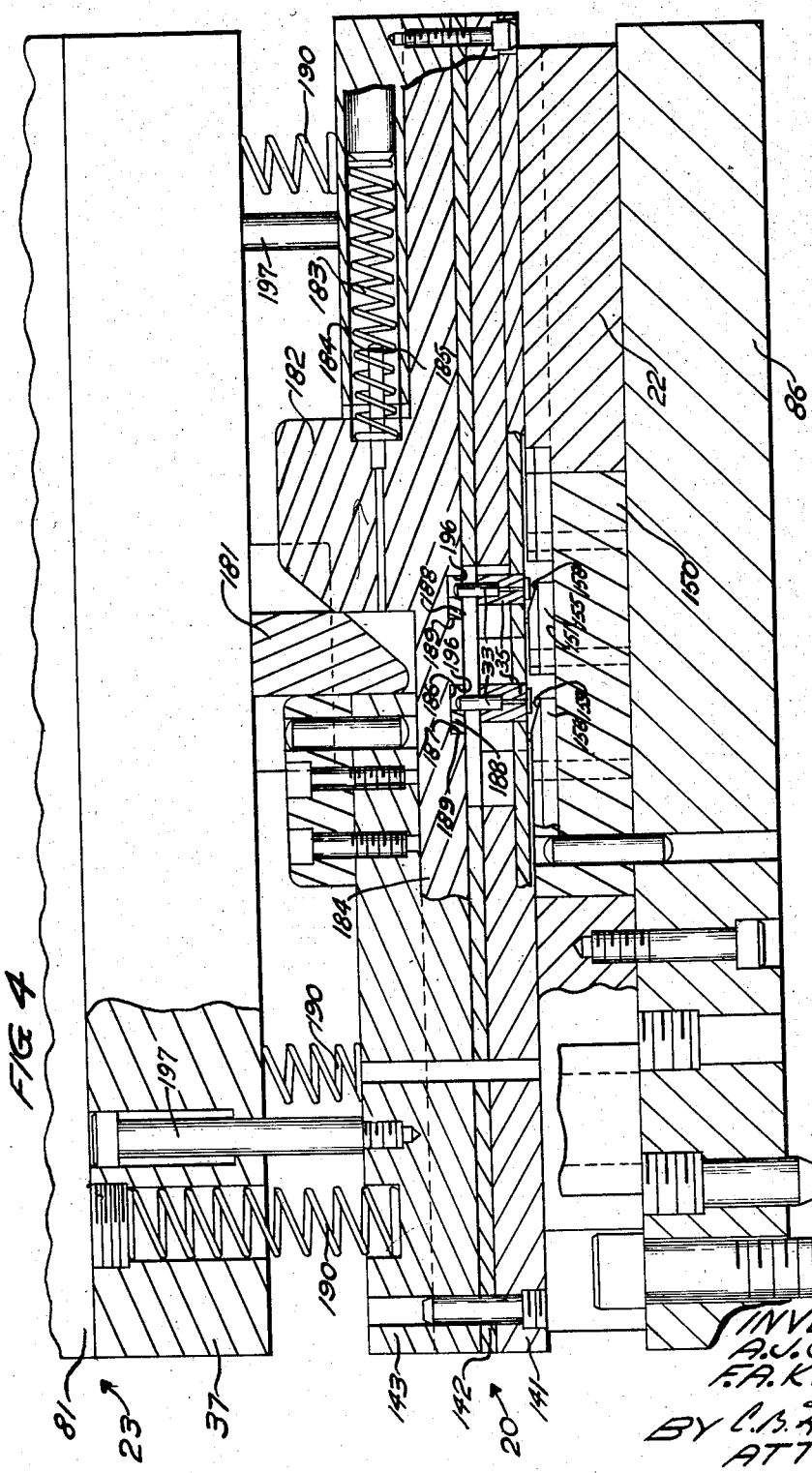

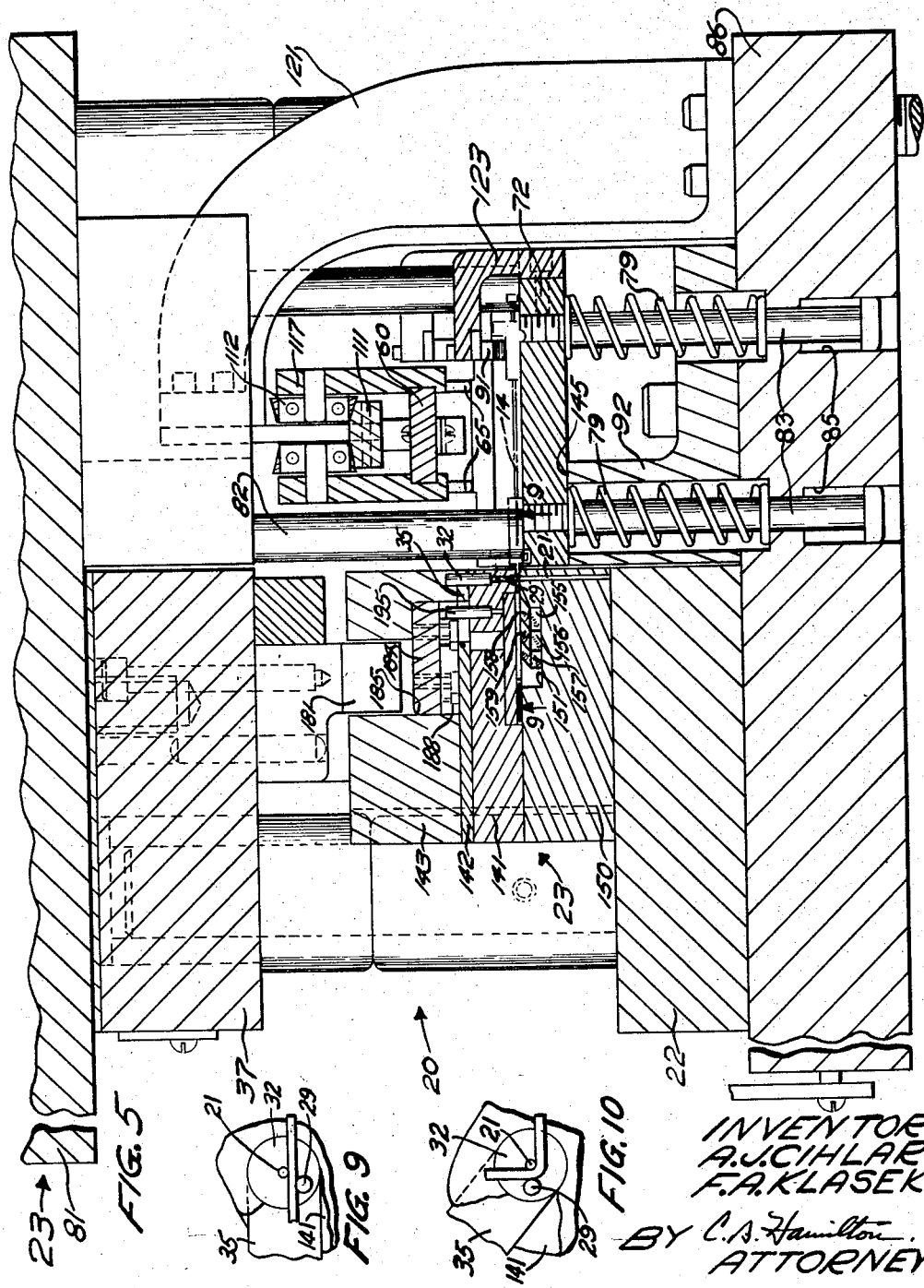

United States Patent Office 2,881,820
Patented Apr. 14, 1959

2,881,820

RECIPROCABLE CAM MEANS FOR OPERATING A PIVOTED TYPE BENDER MEANS

Anthony J. Cihlar, Riverside, and Frank A. Klasek, La Grange Park, Ill., assignors to Western Electric Company, Incorporated, New York, N.Y., a corporation of New York Application December 29, 1954, Serial No. 478,337

7 Claims. (Cl. 153—40)

This invention relates to apparatus for forming articles, and more particularly to apparatus for bending terminal end portions of wires of wire spring relay combs.

An object of the invention is to provide apparatus for bending closely spaced wires of a wire spring relay comb sequentially to form terminals or contact portions.

An apparatus illustrating certain features of the invention may include a die having a plurality of pins around which wires may be bent and located in predetermined positions thereon, means for feeding a wire spring relay comb having a plurality of wires projecting parallelly from one end thereof sequentially to positions relative to the pins such that certain ones of the wires are adjacent to and offset from the pins. Means also are provided for moving the combs so as to intermesh the wires with the pins, and means are provided for forming the wires around the pins after the pins have been threaded on or intermeshed with the wires.

A complete understanding of the invention may be obtained from the following detailed description of an apparatus forming a specific embodiment thereof, when read in conjunction with the appended drawings, in which Fig. 1 is a top plan view of a portion of an apparatus forming one embodiment of the invention;

Fig. 2 is a bottom plan view of another portion of the apparatus shown in Fig. 1 transposed end for end;

Fig. 3 is an enlarged vertical section taken along line 3—3 of Fig. 1;

Fig. 4 is an enlarged vertical section taken along line 4—4 of Fig. 1;

Fig. 5 is an enlarged vertical section taken along line 5—5 of Fig. 1;

Figure 6:
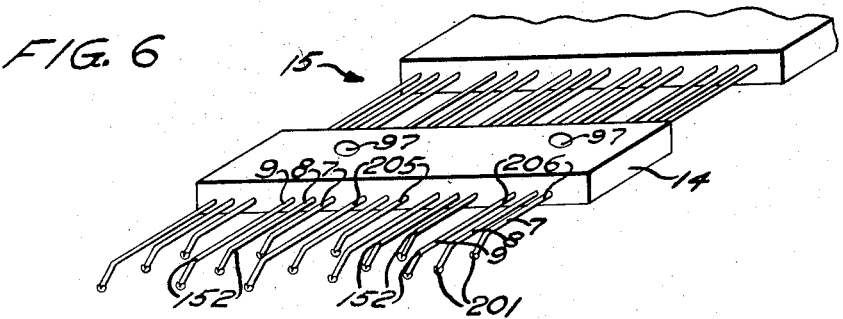
Figure 7:
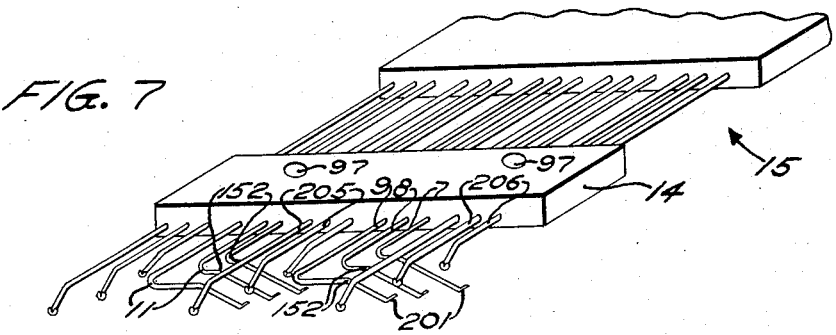
Figure 8:
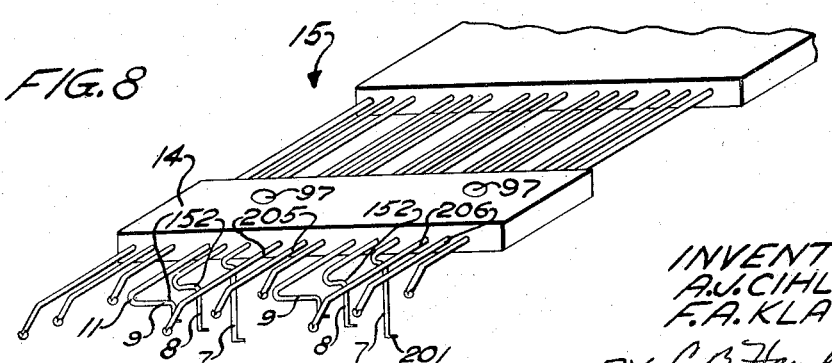

Figs. 6, 7 and 8 are perspective views of wire spring relay combs in several stages of formation by the apparatus shown in Fig. 1; and Figs. 9 and 10 are horizontal sections taken along line 9—9 of Fig. 5.

Referring now in detail to the drawings, there is shown therein an apparatus for forming ends of wires 7, 8 and 9 (Figs. 6, 7 and 8) to horizontal right angle bends 11, the wires projecting beyond molded blocks 14 of wire spring relay combs 15. The apparatus includes three forming stations 17, 18 and 19 (Fig. 1), and the right angle bends 11 in the wires 7 are formed at the station 17, the right angle bends 11 in the wires 8 are formed at the station 18 and the right angle bends 11 in the wires 9 are formed at the station 19. The bends 11 in the wires 7 are formed around pins or fixed bending posts 21 projecting from a bed or bottom platen 22 of a tool unit 20 replaceable in a press 23. Pins 24 are similarly mounted on the bed 22 at the station 18 and pins 25 are mounted on the bed 22 at the station 19. The wires are engaged and bent around the pins 21, 24 and 25 by arcuate, rigid projecting fingers or dogs 28, 29 and 30 (Fig. 2) mounted on shafts 31, 32 and 33, which shafts are turned by crank arms 34, 35 and 36, respectively. The dogs and the crank arms are mounted pivotally about the center of the shafts 31, 32 and 33 mounted on an upper platen 37 of the tool unit 20.

The combs 15 are fed from right to left, as viewed in Fig. 3, by a feed bar 60 which is adjustably fastened by a connector 61 to a piston rod 62 of a piston 63 mounted in a pneumatic cylinder 64 controlled by a suitable four-way valve (not shown). The cylinder 64 and the piston 63 reciprocate the rod 62, and, each time the rod 62 is reciprocated, feed pawls 65 engage and push the blocks of the combs 15 to the left a distance just sufficient to move the combs from one station to the next. Each time the feed bar 60 is retracted, the pawls 65 ride over the combs 15 without moving the combs, the combs being held against movement back with the feed bar by holding pawls 71 mounted on a resiliently mounted plate 72 and pawls 73 mounted on a fixed plate 74.

After each feeding movement and retraction of the bar 60 (Fig. 3), the press 23 is operated and an upper platen 81 of the press having the platen 37 fixed thereto is moved downwardly to move, through push rods 82 and against springs 79, the plate 72 downwardly out of the plane of the plate 74 and a feeding station plate 75. The springs 79 are mounted on rods 83 slidable in bores 84, and are seated in counterbores 85 in a fixed base plate 86 of the press 23 to which the lower platen 22 is fastened. The combs 15 are pressed against the plate 72 by leaf springs 91 and the wires 7, 8 and 9 of the combs 15 are moved into positions in which the pins 21, 24 and 25 project therebetween. Downward movement of the plate 72 is limited by a stop 145 of a block 92 which supports tapered locating pins 93 projecting into and slidable in bores 94 in the plate 72. As the plate 72 is moved downwardly from its uppermost or feed position to its lowermost or work position, the blocks 14 of the combs 15 carried thereby are moved over the pins 93, which enter close-fitting bores 97 (Figs. 6, 7 and 8) to precisely and firmly locate the combs 15 on the plate 72. Three sets of presser rods 98, urged downwardly in bores 99 in the platen 81 by springs 100, are mounted in alignment with the pins 93 and receive the tapered ends of the pins 93 in complementary sockets 101. The presser rods 98 aid the springs 91 in keeping the blocks 14 seated on the plate 72 as the plate 72 is lowered.

The feed bar 60 is supported by a rigid guide rail 111 and rollers 112 mounted on bearings 113 and having tapered or frustoconical portions 114 rollable along tapered upper surfaces 115 of the rail 111. The rollers 112 are mounted rotatably on plates 117 bracketing the rail 111 and fixed to the feed bar 60 to form a trolley type suspension for the bar 60. The rail 111 is rigid, and is supported at its ends by fixed brackets 121 and 122. The arcuate holddown springs 91 are carried by brackets 123 (Fig. 5) fixed to the plates 72, and leaf springs 124 fixed to the feed bar 60 press against the bottom of the rail 111 to urge the feed bar to a predetermined level limited by the rollers 112 and the rail 111. The springs 124 permit upward movement of the bar 60 by warped or dislocated blocks 14. The upward movement of the plate 72 by the springs 79 is limited by lap joint type projections 128 and 129 on the plate 72 which engage complementary projections 130 and 131, respectively, on fixed plates 74 and 75 forming slides or supports for the combs at opposite ends of the plate 72. Certain features of the above described apparatus are disclosed and claimed in our copending application Serial No. 478,336, filed December 29, 1954, for "Methods of and Apparatus for Forming Articles," now U. S. Patent No. 2,834,393, issued May 13, 1958.

The upper platen 37 of the tool unit 20 carries assembly plates or bars 141, 142 and 143 (Fig. 4) resiliently thereon, which are urged downwardly away from the platen 37 and form a holder. As the platen 37 is moved downwardly, it moves the plate 72 downwardly to the stop surface 145 to move the wires 7, 8 and 9 into intermeshing positions relative to the pins 21, 24 and 25, recesses 151 being provided in a block 150 for clearance for the ends of the wires, which have 30° downwardly directed bends 152 (Figs. 6, 7 and 8) therein so that they may travel under adjacent groups of wires as the 90° horizontal bends are formed therein. Supports 155, 156 and 157 having portions of 30° frustums 158, 159 and 160 supporting the wires 7, 8 and 9 to keep the wires from slipping downwardly out of contact with the dogs 29 after the dogs are brought down to intersect the plane of the wires and are actuated to bend the wires around the pins 21, 24 and 25. The shafts 31, 32 and 33 have bores 161 therein for receiving and giving lateral support to the upper ends of the pins 21, 24 and 25.

The tool unit 20 (Figs. 2, 4 and 5) includes a cam 181 carried with the platen 37 for pushing, when lowered, a cam follower 182 to the right, as viewed in Fig. 4, against a spring 183. The cam follower 182 is fixed to and pushes an actuating slide or cross-slide 184 to the right, as viewed in Fig. 4 along a guideway 185 formed in the plate 143. The slide 184 has slots 186 therein each having a slanting wall 187 in which a wedge-shaped actuating plate 188 having a complementary slanting wall 189 is adjustably bolted to the slide 184. When the slide 184 is pushed to the right, as viewed in Fig. 4, simultaneously with the latter portion of the downward stroke of the platens 81 and 37, the plates 188 push pins 195 in the arms 34, 35 and 36 to the right to turn the levers or crank arms 34, 35 and 36 to bend the wires 7, 8 and 9 engaged by the dogs 28, 29 and 30 90° horizontally.

The plate 143 normally is urged away from the platen 37 by springs 190, and, as the platens 37 and 81 start back up, the plates 141, 142 and 143 remain down against the plate 150 until the cam 181 has retracted and the slide 184 has returned, by walls 196 of the slots 186 pushing the pins 195, the levers 34, 35 and 36 to their normal wire-clearing positions. Then the plates 141, 142 and 143 are lifted upwardly from the plate 150 by rods 197, and from the plate 72 (Figs. 3 and 5) after the plate 72 is stopped by the plates 74 and 75. The piston 63 (Fig. 3) then may be actuated to reciprocate the feed bar 60 and feed each of the combs one station to the left, as viewed in Fig. 3. On the forward stroke of the feed bar 60, the furthermost right comb 15 at the feed position is fed under the holddown springs 91 to the station 17, and each of the combs 15 are fed one station to the left. On the retracting stroke of the feed bar 60, the pawls 71 and 73 keep the combs from being pulled back to the right.

*Operation*

The combs 15, prior to arrival at the press 23, have spades 201 (Figs. 6, 7 and 8) formed thereon, and the 30° vertical bends 152 are made at progressively farther points to the spades 201 proceeding from the wires 7 to the wires 9. The bends 152 are provided at this time so that, as the bends 11 are formed, the spade portions 201 will pass under and not be obstructed by adjacent groups of wires 205 and 206. Each comb is pushed by the bar 60 step-by-step from the station to the right of the station 17, as viewed in Fig. 3, from the station 17 to the station 18, from the station 18 to the station 19 and from the station 19 to the station to the left thereof. The press 23 is reciprocated between each feeding movement. On each downward movement of the platen 81, the rods 82 first push the plate 72 against the block 92, and the plate 141 (Fig. 5) is pushed against the block 150. The rods 98 (Fig. 3) push the blocks 14 down on the alignment pins 93 to precisely locate the combs 15, and the wires 7, 8 and 9 rest on the supports 155, 156 and 157 in the recesses 151. After this lost motion, on further downward movement of the platen 81, the cam 181 pushes the follower 182 and the actuating slide 184 to the right, as viewed in Fig. 4, to swing the crank arms 34, 35 and 36 (Fig. 3) to bend the wires 7, 8 and 9 to form the 90° horizontal bends 11, the spades 201 and end portions of the wires swinging under the wires 205 and 206 as the bends are formed. The supports 155, 156 and 157 support the wires as the bends 11 are formed. The bends 11 in the wires 7 are formed at the station 17, those in the wires 8 at the station 18 and those in the wires 9 at the station 19.

After the combs 15 have been moved out of the press 23, another press (not shown) forms bends corresponding to the bends 11 in the wires 205 and 206 after 30° bends corresponding to the bends 152 have been made. Another press (not shown) then bends the wires 7, 8, 9, 205 and 206 to make these bends 90°. By first forming the 30° bends rather than the full 90° vertical bends, the wires may be bent into the 90° horizontal bends 11 without slippage on the wires by the bending dogs, which is of particular importance in bending the wires 7 where a very short horizontal portion projects beyond the bends 11. By bending the wires 7, 8 and 9 at different stations and the wires 205 and 206 in a different press sufficient space is provided to make the bending elements rugged and durable.

The above-described method and apparatus rapidly forms the several bends very accurately, and feeds the combs surely and precisely.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A wire-bending device, which comprises a fixed bending post, a crank having a shaft portion having a bore for receiving rotatably one end of the post for laterally supporting that end of the post and also having a bending dog for bending a wire positioned between the dog and the post, a holder mounting the crank in a position in which the shaft portion is aligned with the post for moving the shaft portion over said end of the post, a cross-slide transversely reciprocable in said holder for actuating the crank, means for actuating the cross-slide, a platen movable toward and away from the post and carrying said actuating means, and means mounting the holder on the platen and urging the holder from the platen.

2. A wire bending apparatus comprising a fixed platen, a bending pin secured to said fixed platen, a second platen movable toward and away from said fixed platen, a tool holder resiliently mounted on said movable platen and interposed between said platens, a bending tool including an eccentric crank rotatably mounted in said holder, a cross-slide movable on said holder for engaging said eccentric crank to rotate said tool, and a cam on said second platen and operable upon movement of said second platent for moving said cross-slide to rotate said tool.

3. A wire bending apparatus comprising a fixed platen, a bending pin mounted on said fixed platen, a second platen movable toward and away from said fixed platen, a tool holder resiliently mounted on said movable platen and interposed between said platens, a bending tool including an eccentric crank rotatably mounted on said holder in axial alignment with said bending pin, a cross-slide reciprocable in said holder for engaging said eccentric crank to rotate said bending tool, and a cam on said second platen and operable upon movement of said second platen for reciprocating said cross-slide to impart rotative movement to said bending tool.

4. An article-working apparatus comprising a lower tool fixed at a predetermined level, a work support normally held in a position holding an article above the lower tool and movable to a position holding the article in a second position to be worked on by the lower tool, a platen, means for moving the platen toward the lower tool, an upper tool including an eccentric crank, means mounting the upper tool rotatably on the platen, lost motion means connecting the mounting means to the upper platen, a cam carried by said platen and interposed between said platen and said mounting means, and a cross-slide transversely reciprocable in said mounting means and operable by the cam carried by the platen after the upper tool has been moved to the lower tool for engaging said eccentric crank to rotate the upper tool relative to the lower tool.

5. A device for bending wires of a wire spring relay comb comprising a first platen, a bending pin projecting from the platen, a support centered on the pin and positioned at the base of the pin, a second platen movable toward and away from the first platen, a holder, means mounting the holder between the platens on the second platen and movable toward and away from the second platen, means urging the holder away from the second platen, a rotary bending tool including an eccentric crank carried by the holder in alignment with the pin, a cross-slide transversely reciprocable in the holder for engaging the eccentric crank to turn the tool, and a cam mounted on said second platen and operable by relative movement toward one another of the holder and the second platen for reciprocating the cross-slide to rotate the bending tool.

6. A device for bending wires of a wire spring relay comb comprising a lower platen, a plurality of bending pins projecting upwardly from the platen, an upper platen movable toward and away from the lower platen, a holder, means mounting the holder on the bottom face of the upper platen for movement toward and away from the upper platen, means urging the holder away from the upper platen, a plurality of rotary bending tools carried by the holder in alignment with the pins, each of said bending tools being provided with an eccentric crank, a transverse cross-slide means carried by the holder for engaging the eccentric cranks to turn the tools, and a cam carried by the upper platen and operable upon relative movement toward one another of the holder and the upper platen for reciprocating the cross-slide means to rotate the bending tools.

7. A device for bending wires of a wire spring relay comb comprising a lower platen, a plurality of bending pins projecting upwardly from the platen, said platen having a plurality of frustoconical supports centered on the pins, an upper platen movable toward and away from the lower platen, a holder, means mounting the holder on the bottom face of the upper platen for movement toward and away from the upper platen, means urging the holder away from the upper platen, a plurality of rotary bending tools carried by the holder in alignment with the pins, each of said bending tools being provided with an eccentric crank, cross-slide means reciprocable in the holder for engaging the eccentric cranks to turn the tools, and a cam mounted on the upper platen and operable by relative movement toward one another of the holder and the upper platen for reciprocating the cross-slide means to rotate the bending tools.

References Cited in the file of this patent

UNITED STATES PATENTS

| | | |
|---|---|---|
| 1,050,348 | Cronander | Jan. 14, 1913 |
| 1,867,723 | Adams | July 19, 1932 |
| 2,361,983 | Veley | Nov. 7, 1944 |
| 2,471,083 | Tuttle | May 24, 1949 |
| 2,517,436 | Jones | Aug. 1, 1950 |
| 2,681,027 | Boll | June 15, 1954 |
| 2,705,027 | Sanborn | Mar. 29, 1955 |
| 2,770,262 | Gauci | Nov. 13, 1956 |

FOREIGN PATENTS

| | | |
|---|---|---|
| 323,499 | France | Nov. 11, 1902 |